(12) United States Patent
Chapman (10) Patent No.: US 8,235,413 B2
(45) Date of Patent: Aug. 7, 2012

(54) AIRBAG HOUSING

(75) Inventor: Stephen Lee Chapman, Oak Ridge, NC (US)

(73) Assignee: TK Holdings Inc., Auburn Hills, MI (US)

( * ) Notice: Subject to any disclaimer, the term of this patent is extended or adjusted under 35 U.S.C. 154(b) by 225 days.

(21) Appl. No.: 12/662,415

(22) Filed: Apr. 16, 2010

(65) Prior Publication Data

US 2011/0018238 A1    Jan. 27, 2011

Related U.S. Application Data

(60) Provisional application No. 61/213,867, filed on Jul. 23, 2009.

(51) Int. Cl.
*B60R 21/16* (2006.01)

(52) U.S. Cl. ............... 280/728.2; 280/731; 280/741

(58) Field of Classification Search ............ 280/731, 280/741, 728.2
See application file for complete search history.

(56) References Cited

U.S. PATENT DOCUMENTS

| | | | | |
|---|---|---|---|---|
| 5,388,858 | A * | 2/1995 | Cuevas | 280/728.2 |
| 5,762,364 | A * | 6/1998 | Cuevas | 280/731 |
| 7,048,297 | B2 * | 5/2006 | Schneider | 280/728.2 |
| 7,178,828 | B2 * | 2/2007 | Blackburn | 280/736 |
| 7,293,794 | B2 * | 11/2007 | Clarke et al. | 280/731 |

* cited by examiner

*Primary Examiner* — Toan To
(74) *Attorney, Agent, or Firm* — Foley & Lardner LLP (57) ABSTRACT

An airbag assembly for use within a vehicle includes an airbag, an inflator configured to provide gas to the airbag, and a housing configured to retain the inflator and the airbag in position. The housing includes first and second portions configured to be separably coupled together. The second housing portion includes a second snap mechanism for engaging with a first snap mechanism located on the first housing portion. The engaged housing portions surround and retain the inflator and the airbag in position.

19 Claims, 4 Drawing Sheets

AIRBAG HOUSING

CROSS-REFERENCE TO RELATED PATENT APPLICATIONS

This application claims priority to U.S. Provisional Patent Application No. 61/213,867, filed Jul. 23, 2009, which is incorporated herein by reference in its entirety.

BACKGROUND

The present application relates generally to the field of airbag housings for use within motor vehicles. More specifically, this application relates to an airbag housing having an improved method of construction that makes it easier to manufacture the airbag assembly, reduces the number of components required, and provides for integrated retention of an airbag cushion or airbag and a gas generator or an inflator.

Airbags are one type of restraint system typically located in vehicles to protect occupants from injury during a vehicle dynamic impact event. Typical restraint systems include sensors located in the vehicle to initiate deployment of the airbag. An airbag may deploy and inflate, by gas rapidly entering the airbag, typically through the use of an inflator containing an explosive charge (e.g., pyrotechnic device). Passenger airbags are typically stored within and deployed from the vehicle dashboard or instrument panel, and are typically packaged through a process of folding and rolling to compact the airbag in order to minimize the required packaging space for the airbag. During a vehicle dynamic impact event, a passenger airbag may deploy from the upper portion (i.e., above the glove box) of the dashboard, in substantially rearward and upward directions to protect the head and torso of the occupant. A passenger airbag may also deploy from the rear facing portion of the dashboard in substantially a rearward direction toward the occupant. Driver airbags are typically stored within the steering column and are typically packaged through a process of folding and rolling to compact the airbag in order to minimize its required packaging space. During a vehicle dynamic impact event, a driver airbag may deploy in a substantially rearward direction toward the driver to protect the head and torso of the driver.

It has been known to construct a driver-side airbag assembly to include an airbag housing made of a polymer or composite material. A conventional airbag housing may include a retainer and a cover that are brought together to sandwich between them an inflator and an airbag cushion, whereby through the use of conventional fasteners (e.g., screws) the retainer and the cover of the housing are coupled to retain the inflator and airbag cushion. The method of constructing the conventional airbag housing has several disadvantages, some of which are as disclosed hereafter. First, the use of fasteners increases cost through increased piece-cost, manufacture time required to drive (attach) the fasteners, and material handling and floor space required for the fasteners. Second, the use of fasteners increases the required quality control measures required. For example, fasteners require monitoring devices to assure proper assembly, such as torque monitoring devices to ensure that proper installation torque is achieved during the driving of the fastener. The torque monitoring data requires evaluation and then must be maintained or stored in the event that there are any issues downstream.

It would be advantageous for an airbag housing to be constructed to provide for improved manufacturability through a reduced manufacture cycle time that involves the use of fewer components. It would be further advantageous if an airbag housing could have a relative lower cost when compared to conventional airbag housings. For example, an airbag housing constructed to include fewer components has a lower piece cost, manufacturing cost, and validation costs. It would also be advantageous to improve the integrity of the airbag assembly.

SUMMARY

One embodiment relates to an airbag assembly for use within a vehicle. The airbag assembly includes an airbag, an inflator configured to provide inflation gas to the airbag, and a housing configured to retain the inflator and the airbag in position. The housing includes first and second portions configured to be separably coupled together. The second housing portion includes a second snap mechanism for engaging with a first snap mechanism located on the first housing portion. The engaged housing portions surround and retain the inflator and the airbag in position.

It is to be understood that both the foregoing general description and the following detailed description are exemplary and explanatory only, and are not restrictive of the embodiments as claimed.

BRIEF DESCRIPTION OF THE DRAWINGS

These and other features, aspects, and advantages of the present embodiments will become apparent from the following description, appended claims, and the accompanying exemplary embodiments shown in the drawings, which are briefly described below.

DETAILED DESCRIPTION

The same or like reference numbers have been used throughout the drawings to refer to the same or like parts. Although the specification refers primarily to a driver-side airbag assembly, it should be understood that the subject matter herein is applicable to an airbag assembly in general.

Figure 1:
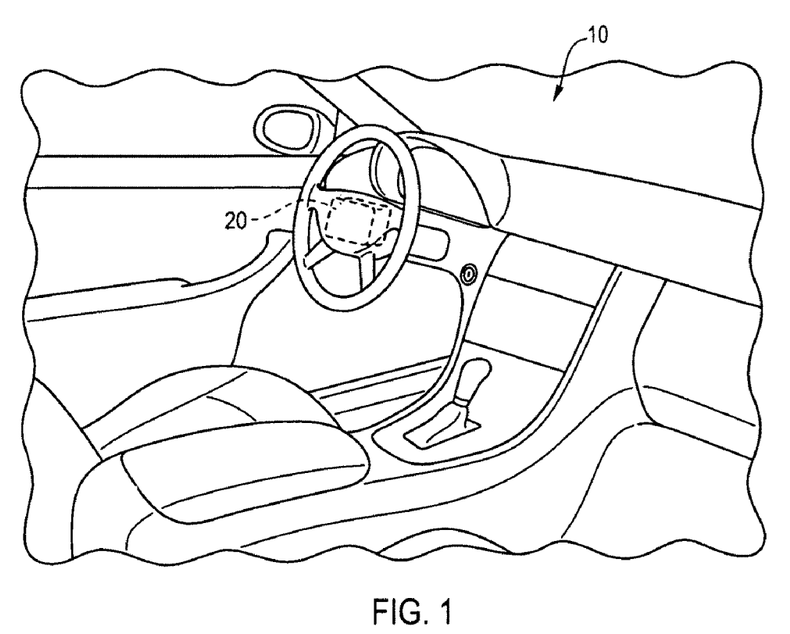
FIG. 1 is a perspective view of a passenger compartment of an exemplary motor vehicle.
Figure 2:
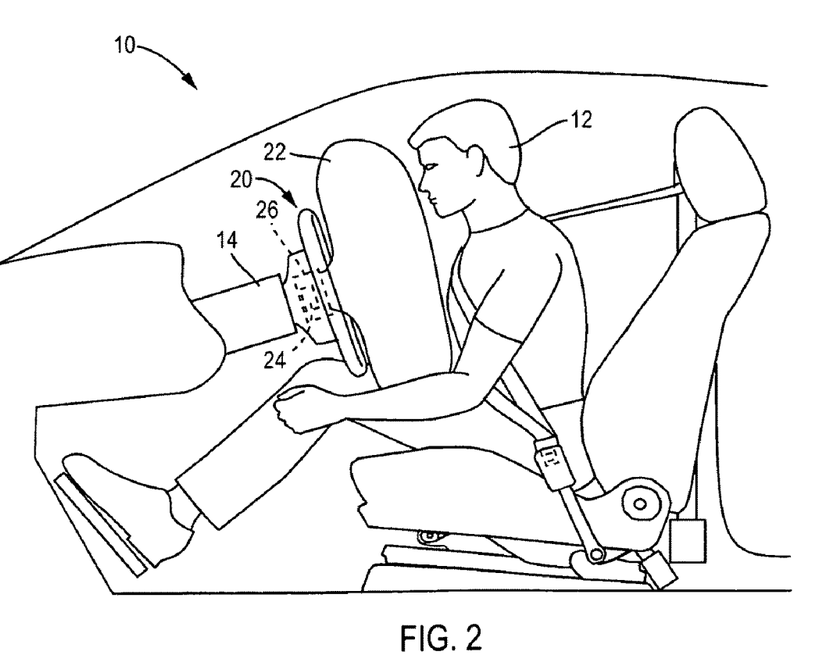
FIG. 2 is a cross-car partial section view of a driver-side airbag shown in a deployed or unfolded position supporting an occupant.

FIG. 1-7 illustrate an airbag assembly 20, for example a driver-side airbag assembly 20, for use within a motor vehicle 10. As shown in FIG. 1, the vehicle 10 may be a typical sedan. Other types of passenger vehicles (e.g. truck, van, cross-over vehicle, etc.), as well as other moving vehicles that offer occupant protection to seated passengers in the form of frontal airbags (such as driver-side airbags included in driver-side airbag assemblies) may also be used. The driver-side airbag assembly 20 may be used within the vehicle 10 to provide an occupant 12 (e.g., driver) with frontal protection during a vehicle dynamic event that triggers deployment of the airbag assembly 20.

The airbag assembly 20 may include an airbag 22 or airbag cushion 22, an inflator 24 configured to provide gas to the airbag 22, and a housing 26 configured to retain the inflator 24 and the airbag 22 in position.

Typically, deployment of the airbag 22 included in the driver-side airbag assembly 20 is triggered by a dynamic impact of the vehicle 10, whereby impact sensors communicate to a vehicle module or other device which communicates to the inflator 24 of the airbag assembly 20 to initiate generation of inflation gas, which is then forced into the airbag cushion 22 of the driver-side airbag assembly 20. As the amount of inflation gas forced into the airbag cushion 22 of the driver-side airbag assembly 20 increases, the internal chamber pressure of the airbag cushion 22 increases, allowing the airbag cushion 22 to breach the steering column 14 (or other stored position), whereby the airbag cushion 22 deploys substantially outward (i.e., substantially perpendicular to the longitudinal or fore-aft axis of the vehicle) and rearward toward the occupant 12. The airbag 22 of the driver-side airbag assembly 20 improves occupant safety by providing protection to the occupant 12 by limiting further driver-side displacement of and by decelerating the occupant 12. The airbag cushion 22 of the airbag assembly 20 also absorbs energy, such as kinetic energy, and the forces exerted by the occupant 12 when the vehicle accelerates or decelerates. The airbag cushion 22 absorbs energy from the occupant 12 that would otherwise be transferred to the occupant 12 through an impact to the steering column 14 or other relatively rigid bodies within in the vehicle 10 interior.

Figure 3:
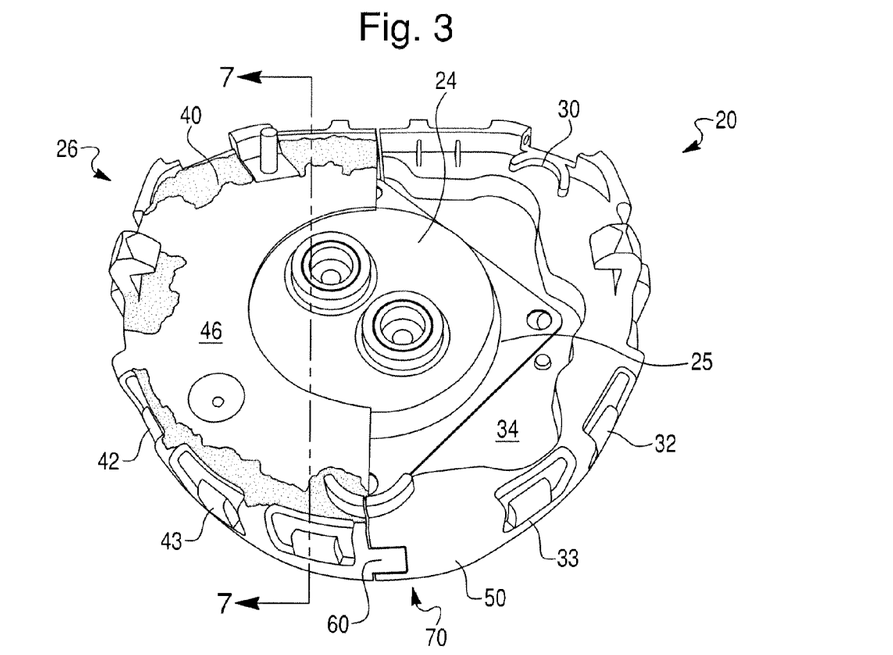
FIG. 3 is a perspective view of an exemplary driver-side airbag assembly illustrating first and second housing portions coupled together.
Figure 4:
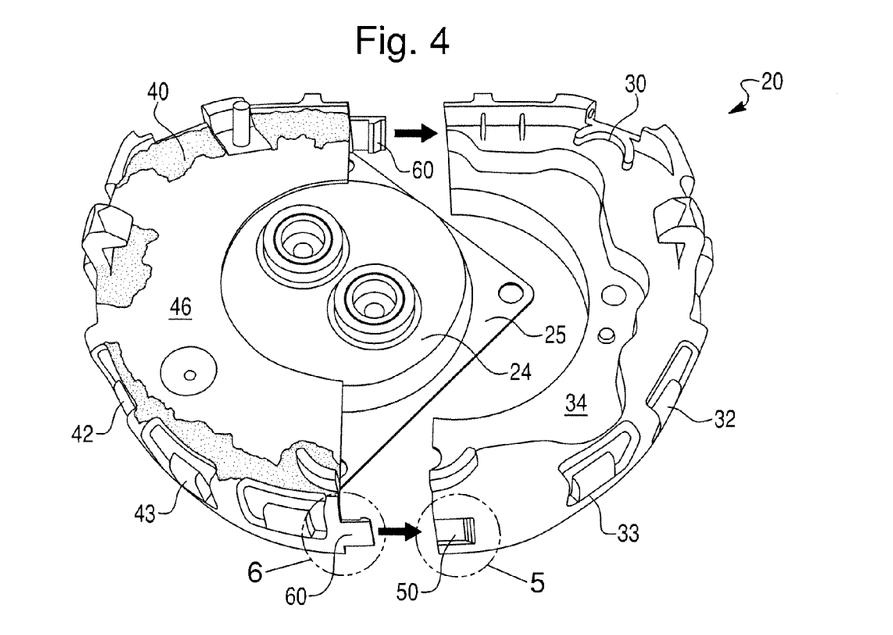
FIG. 4 is a perspective view of the driver-side airbag assembly of FIG. 3, illustrating the first and second housing portions uncoupled.

Referring to FIGS. 3 and 4, the airbag housing 26 may include a first housing portion 30 and a second housing portion 40 configured to be separably coupled together. FIG. 3 illustrates the first housing portion 30 and the second housing portion 40 coupled together thereby retaining the inflator 24, while FIG. 4 illustrates the inflator 24 being retained by the second housing portion 40 with the first housing portion 30 decoupled from the second housing portion 40.

The first housing portion 30 may include a first snap mechanism 50 and the second housing portion 40 includes a second snap mechanism 60. Alternatively, the first housing portion 30 and the second housing portion 40 may include more than one first snap mechanism 50 and more than one second snap mechanism 60 respectively (not shown). The second snap mechanism 60 engages with the first snap mechanism 50 located on the first housing portion 30, such that the first housing portion 30 and the second housing portion 40 are coupled together. When the first housing portion 30 and the second housing portion 40 are coupled together, the first housing portion 30 and the second housing portion 40 may retain the inflator 24 and the airbag cushion 22 (see FIG. 7).

The first housing portion 30 may be made from a polymer, composite material (e.g., a fiber-reinforced polymer), or another useful material, preferably made through an injection molding process. Additionally, the first housing portion 30 may be made from other materials using other manufacturing processes. The first housing portion 30 may include a base 32 or a base portion 32, a lower retaining wall 34, and an upper retaining wall (not shown). The first housing portion 30 may be made having any useful shape. For example, as shown in FIGS. 3-4, the first housing portion 30 may be a substantially C-shaped body. Other exemplary shapes include a substantially D-shaped body. The first housing portion 30 may also include one or more upper retaining walls or lower retaining walls 34.

If the first housing portion 30 is a substantially C-shaped body, the base 32 may form the outer profile of the first housing portion 30 with the upper retaining wall and the lower retaining wall 34 protruding or extending away from the base 32 in toward, but short of the center of the C-shaped body, leaving a void portion that may be substantially filled by the inflator 24.

The upper retaining wall and the lower retaining wall 34 may be substantially parallel to each other and substantially perpendicular to the base 32, but offset from each other to form a cavity 38 (FIG. 7) in between the upper retaining wall and the lower retaining wall 34. Alternatively, the upper retaining wall and the lower retaining wall 34 may extend any length from the base 32 of the first housing portion 30, and may extend at an angle relative to each other or relative to the base 32.

The first housing portion 30 may include at least one first snap mechanism 50. For example, referring to FIG. 4, the first housing 30 may include two first snap mechanisms 50, whereby each first snap mechanism 50 is located proximate to one end of the C-shape of the housing 30, and is positioned on the outside surface 33 of the base 32. Alternatively, the first housing portion 30 may have any number of first snap mechanisms 50, which may be positioned on the outside surface 33 of the base 32, on the upper retaining wall, on the lower retaining wall 34, any combination of the previous, or on any useful surface of the first housing portion 30.

The second housing portion 40 may be made from a polymer, a composite material (e.g., a fiber reinforced polymer), or another useful material, preferably made through an injection molding process. Additionally, the second housing portion 40 may be made from other materials using other manufacturing processes. The second housing portion 40 may be configured to be a substantially symmetrically mirror image of the first housing portion 30, except the second housing portion 40 may include one or more second snap mechanisms 60 that are a mating shape to the first snap mechanisms 50 of the first housing portion 30. The second housing portion 40 may include a base 42 or a base portion 42, a lower retaining wall 44 (FIG. 7), and an upper retaining wall 46. The second housing portion 40 may be made having any useful shape. For example, as shown in FIGS. 3-4, the second housing portion 40 may be a substantially C-shaped body. Other exemplary shapes include a substantially D-shaped body. The first housing portion 40 may also include one or more upper retaining walls 46 or lower retaining walls 44.

If the second housing portion 40 is a substantially C-shaped body, the base 42 may form the outer profile of the second housing portion 40 with the upper retaining wall 46 and the lower retaining wall 44 protruding or extending away from the base 42 in toward, but short of the center of the C-shape body, leaving a void portion that may be substantially filled by the inflator 24.

The upper retaining wall 46 and the lower retaining wall 44 of the second housing portion 40 may be substantially parallel to each other and substantially perpendicular to the base 42, but offset from each other to form a cavity 38 in between the upper retaining wall 46 and the lower retaining wall 44. Alternatively, the upper retaining wall 46 and the lower retaining wall 44 may extend any length from the base 42 of the second housing portion, and may extend at an angle relative to each other or relative to the base 42.

The second housing portion 40 may include at least one second snap mechanism 60. For example, referring to FIG. 4, the second housing 40 may include two second snap mechanisms 60, whereby each second snap mechanism 60 is located proximate to one end of the C-shape body of the second housing portion 40 and is positioned on the outside surface 43 of the base 42. Alternatively, the second housing portion 40 may have any number of second snap mechanisms 60, which may be positioned on the outside surface 43 of the base 42, on the upper retaining wall 46, on the lower retaining wall 44, any combination of the previous, or any useful surface of the second housing portion 40.

Referring to FIGS. 3, 4 and 5A-6C, exemplary portions of a snap mechanism 70 are shown. The snap mechanism 70 may include the first snap mechanism 50 (e.g., first snap portion, receiving portion, etc.) that may receive a corresponding second snap mechanism 60 (e.g., second snap portion, engaging portion, etc.) to couple the first housing portion 30 to the second housing portion 40, where the second snap mechanism 60 engages the first snap mechanism 50.

Figure 5A:
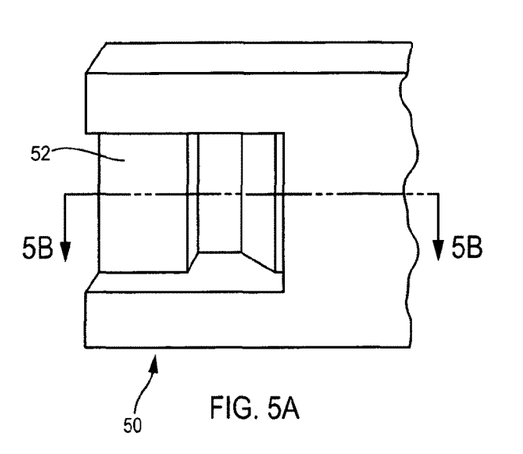
FIG. 5A is a perspective view of an exemplary first snap mechanism, such as the first snap mechanism for use on the first housing portion.
Figure 5B:
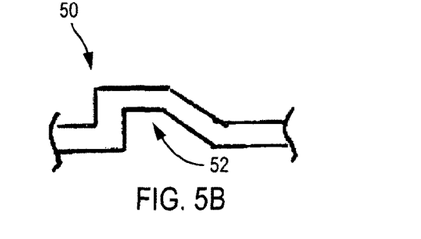
FIG. 5B is a cross-section of the first snap mechanism of FIG. 5A, taken along line 5B-5B.
Figure 5C:
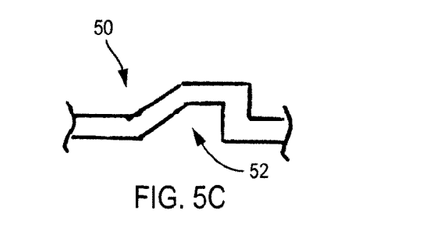
FIG. 5C is a cross-section of another exemplary first snap mechanism.

The first snap mechanism 50, as illustrated in FIGS. 5A-5C, may include a recess or a void 52 that is configured to be similar to the shape of a detent feature 66 of the second snap mechanism 60, whereby the recess 52 receives the detent feature 66 of the second snap mechanism 60. The recess 52 may be configured to have any useful shape, such as shown in FIGS. 5B-5C, and is typically configured to have a geometry substantially similar to the detent feature 66.

Figure 6A:
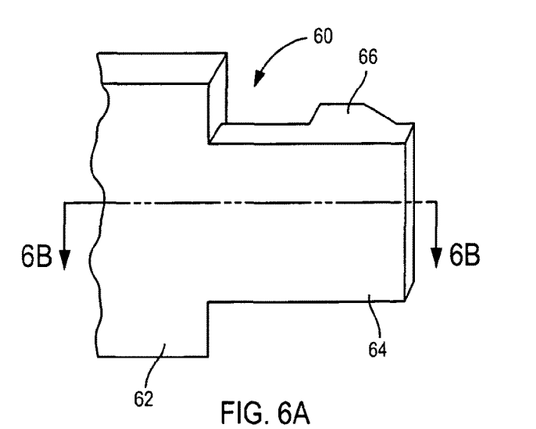
FIG. 6A is a perspective view of an exemplary second snap mechanism, such as the second snap mechanism for use on the second housing portion.
Figure 6B:
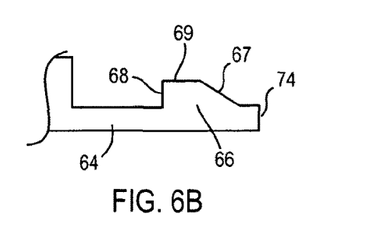
FIG. 6B is a cross-section of the second snap mechanism of FIG. 6A, taken along line 6B-6B.
Figure 6C:
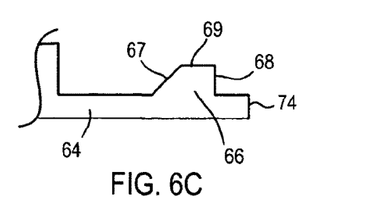
FIG. 6C is a cross-section of another exemplary second snap mechanism.
Figure 6D:
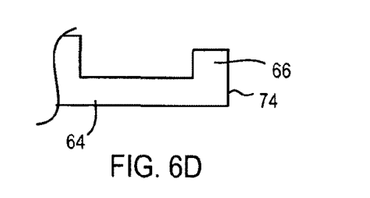
FIG. 6D is a cross-section of yet another second snap mechanism.

The second snap mechanism 60, as illustrated in FIGS. 6A-6D, includes a cantilevered section 64 extending from a base 62, whereby the cantilevered section 64 includes a detent feature 66 or detent 66 on one surface configured to engage the recess 52 of the first snap mechanism 50 so as to couple the first snap mechanism 50 to the second snap mechanism 60. As shown in FIG. 6B, the detent feature 66 may, for example, include an angled surface 67 (e.g., ramp surface, sloped surface, wedge surface, etc.) proximate to a free end 74 of the cantilevered section 64 and a surface 68 (e.g., retention surface, contact surface, etc.) substantially perpendicular to the wall of the cantilevered section 64. The angled surface 67 may be coupled to the perpendicular surface 68 by a surface 69 substantially parallel to the wall of the cantilevered section 64. As shown in FIG. 6C, for example, the detent feature 66 may have the substantially perpendicular surface 68 proximate to the free end 74 of the cantilevered section 64. Alternatively, as shown in FIG. 6D, the engaging portion 66 of the second snap mechanism 60 that engages the first snap mechanism 50 may be substantially L-shaped, having a detent 66 on the end of the cantilevered section 64. In general, the detent feature 66 may take the form of any shape (e.g., two parallel flats, two ramp surfaces, convex or concave surfaces, or any combination), which may be configured to engage a receiving portion or the recess 52 of the first snap portion 50.

The second snap mechanism 60 is also configured to be flexible, so that when the first housing portion 30 and the second housing portion 40 are slideably coupled together, the detent feature 66 contacts a flat section of the first snap mechanism 50, causing the cantilever section 64 to flex and displace about the base 62 of the second snap mechanism 50 in an outward direction away from the first housing portion 30, creating a spring force biasing the second snap mechanism 60 back to its natural (or at rest) position. When the first snap mechanism 50 of the first housing portion 30 is substantially aligned with the second snap mechanism 60 of the second housing portion 40, the recess 52 of the receiving portion 50 allows for the detent feature 66 of the second snap mechanism 60 to substantially fill the recess 52. The detent 66 engages the recess 52 due to the spring force created by the flexing of the cantilever section 64, and allows the cantilever section 64 to return to a substantially natural rest position. Therefore, the first housing portion 30 is coupled to the second housing portion 40 by one or more than one paired snap mechanisms 50 and 60.

Figure 7:
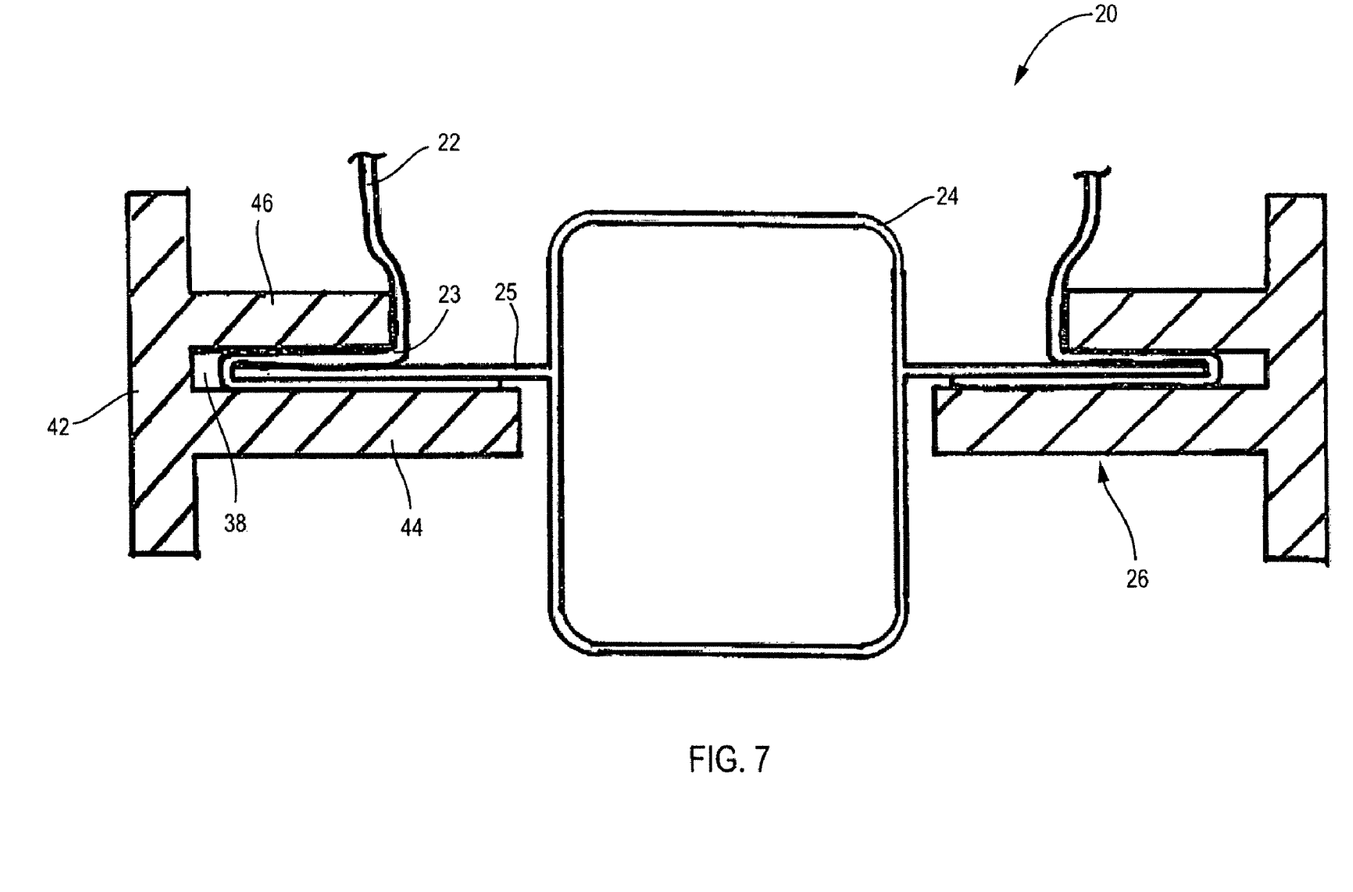
FIG. 7 is a cross-section view of the driver-side airbag assembly shown in FIG. 3, taken along line 7-7, illustrating the retention of the inflator and the airbag cushion within the airbag housing.

Referring to FIG. 7, a cross-section taken along line 7-7 of FIG. 3 is shown, to illustrate the retention of, the inflator 24 and the airbag cushion 22 within the second housing portion 40. Although not shown in FIG. 7, the second housing portion 40 may be coupled to the first housing portion 30, as previously disclosed, where the first housing portion 30 has a cross-section and geometry similar to the second housing portion 40.

As shown in FIG. 7, the inflator 24 may include a flange 25. The flange 25 is configured to be retained within the cavity 38 by the retaining walls 44, 46 of the second housing portion 40. Additionally, a portion 23 of the airbag 22 may be located or retained in the cavity 38 when the housing portions 30, 40 are coupled together. The portion 23 of the airbag cushion 22 may be adjacent to the base 42, the flange 25, the lower retaining wall 44, and the upper retaining wall 46, thereby forming a folded piece 23 or folded portion 23 that is folded over both sides of the flange 25 of the inflator 24, so that the flange 25 is sandwiched between the folded portion 23 of the airbag cushion 22. The folded portion 23 or fold portion 23 of the airbag cushion 22 separated by the flange 25 of the inflator 24, may fill the cavity 38 distance (i.e., the distance between the upper retaining wall 46 and the lower retaining wall 44), so that each layer of the airbag cushion 22 is contacting or proximate to one of the retaining walls 44 and 46.

The configuration of the folded portions 23 of the airbag cushion 22 provide for an improved seal between the airbag cushion 22 and the inflator 24. Specifically, during airbag deployment, the inflation gas generated by the inflator 24 increases the internal chamber pressure of the airbag cushion 22, which in turn increases the forces exerted on the flange 25 of the inflator 24 in the downward direction (i.e., toward the lower retaining wall 44). The downward forces on the flange 25 of the inflator 24 exert a clamp force on the portion 23 of the airbag cushion 22 between the flange 25 of the inflator 24 and the lower retaining wall 44, thereby retaining the portion 23 of the airbag cushion 22 and prohibiting inflation gas from escaping between the flange 25 of the inflator 24 and the lower retaining wall 44. As the internal chamber pressure within the airbag cushion 22 increases, the clamping forces retaining the airbag cushion 22 and sealing the airbag cushion 22 to the flange 25 of the inflator 24 increase proportionally.

The method of sealing the airbag cushion 22 is an improvement over the conventional method of using fasteners to apply a clamping force, local to the head of the fasteners, between the airbag cushion and the inflator. The method creates a seal around all or part of the profile of the airbag cushion 22 retained by the housing 26, not just selected fastened portions, thereby reducing the amount of inflation gas that escapes the airbag cushion 22, improving the deployment of the airbag cushion 22 (e.g., by shortening the deployment time). The method also allows the clamping forces to increase relative to the increasing internal chamber pressure of the airbag cushion 22, improving the seal with increasing airbag chamber pressure. The combined first housing portion 30 and the second housing portion 40 may retain the airbag cushion 22 and the inflator 24 around the entire profile or around a substantial portion of the profile of the airbag cushion 22.

Also referring to FIG. 7, the upper retaining wall 46 may be configured to extend a shorter length from the base 42 relative to the lower retaining wall 44, thereby forming a larger gap between the upper retaining wall 46 and the inflator 24 relative to the gap between the lower retaining wall 44 and the inflator 24. The configuration of the upper retaining wall 46 extending a shorter length from the base 42, allows for the airbag cushion 22 to maintain a greater distance from the inflator 24, which during gas generation, has a relative high temperature that could damage the airbag cushion 22. Additionally, the gap between the upper retaining wall 46 and the inflator 24 may be used to position other airbag assembly components, such as a diffuser.

The driver-side airbag assembly 20 including the airbag 22, the inflator 24, and the housing 26, allows the housing portions 30, 40 to couple and retain the inflator 24, the airbag cushion 22, and other components without the use of traditional fasteners (e.g., nuts and bolts). The removal of fasteners that typically are used to attach and retain the inflator, a cover, and other airbag assembly components to the housing, simplifies the manufacturing process, reduces cost, and improves quality by eliminating the need to monitor and track assembly data, such as installation or driving torque. For example, a conventional housing has four bolts and four corresponding nuts that couple and retain the inflator and airbag cushion to the housing. Also by having fewer overall critical components, the quality and integrity of the system is improved.

As utilized herein, the terms "approximately," "about," "substantially", and similar terms are intended to have a broad meaning in harmony with the common and accepted usage by those of ordinary skill in the art to which the subject matter of this application pertains. It should be understood by those of skill in the art who review this application that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the pet restraint systems as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present embodiments.

What is claimed is:

1. An airbag assembly for use within a vehicle, comprising:
an airbag;
an inflator configured to provide inflation gas to the airbag; and
a housing configured to retain the inflator and the airbag in position,
wherein the housing includes first and second housing portions configured to be separably coupled together;
wherein each of the first portion and second portion forms a section of an inner perimeter that circumscribes an outer perimeter of the inflator when coupled together,
wherein the second housing portion includes a second snap mechanism for engaging with a first snap mechanism located on the first housing portion, and
wherein the engaged first and second housing portions surround and retain the inflator and the airbag in position.

2. The assembly of claim 1, wherein the first and second housing portions are substantially the same size and shape.

3. An airbag assembly for use within a vehicle, comprising:
an airbag;
an inflator configured to provide inflation gas to the airbag; and
a housing configured to retain the inflator and the airbag in position,
wherein the housing includes first and second housing portions configured to be separably coupled together;
wherein the second housing portion includes a second snap mechanism for engaging with a first snap mechanism located on the first housing portion, and
wherein the engaged first and second housing portions surround and retain the inflator and the airbag in position,
wherein each housing portion includes upper and lower retaining walls extending away from a base portion thereby forming a cavity bounded by the upper and lower retaining walls and the base portion; and
wherein a portion of the inflator is located in the cavities when the first and second housing portions are coupled together.

4. The assembly of claim 3, wherein the portion of the inflator comprises a flange.

5. The assembly of claim 4, wherein a portion of the airbag is located in the cavities when the first and second housing portions are coupled together.

6. The assembly of claim 5, wherein the portion of the airbag is adjacent to the base portion, the flange, and the upper and lower retaining walls of the respective housing portion, thereby forming a folded piece.

7. The assembly of claim 5, wherein, during a sudden acceleration or deceleration of the vehicle, a downward force is exerted on the folded pieces, thereby creating a seal around all or part of the portion of the airbag.

8. The airbag assembly of claim 3, wherein the upper and lower retaining walls are substantially perpendicular to the base portions.

9. The airbag assembly of claim 3, wherein the lower retaining walls are substantially parallel to the upper retaining walls.

10. The assembly of claim 3, wherein the upper and lower retaining walls are at an angle relative to the base portions.

11. The airbag assembly of claim 3, wherein the lower retaining walls are at an angle to the upper retaining walls.

12. The airbag assembly of claim 3, wherein the upper retaining walls extend a shorter distance from the base portions than the lower retaining walls.

13. The airbag assembly of claim 3, wherein the first snap mechanism is located on an outside surface of the base portion, on the lower retaining wall, or on the upper retaining wall of the first housing portion; and wherein the second snap mechanism is located on an outside surface of the base portion, on the lower retaining wall, or on the upper retaining wall of the second housing portion.

14. An airbag assembly for use within a vehicle, comprising:
an airbag;
an inflator configured to provide inflation gas to the airbag; and
a housing configured to retain the inflator and the airbag in position,
wherein the housing includes first and second housing portions configured to be separably coupled together;
wherein the second housing portion includes a second snap mechanism for engaging with a first snap mechanism located on the first housing portion, and
wherein the engaged first and second housing portions surround and retain the inflator and the airbag in position,
wherein the second snap mechanism includes a snap base portion and a cantilevered section that extends away from the snap base portion and includes a detent; and
wherein the first snap mechanism includes a recess configured to receive the detent.

15. The airbag assembly of claim 14, wherein the detent includes a surface inclined at an angle relative to the snap base portion that is proximate to a free end of the cantilevered section; and a surface substantially perpendicular to a wall of the cantilevered section.

16. The airbag assembly of claim 14, wherein the detent includes a first surface substantially perpendicular to a wall of the snap cantilevered section that is proximate to a free end of the cantilevered section; and a second surface inclined at an angle relative to the snap base portion.

17. The airbag assembly of claim 14, wherein the detent is located at an end of the cantilevered section and a portion of the second snap mechanism is substantially L-shaped.

18. The airbag assembly of claim 1, wherein the housing comprises a polymer or a composite polymer.

19. The airbag assembly of claim 1, wherein the second snap mechanism is configured to be flexible.

* * * * *

UNITED STATES PATENT AND TRADEMARK OFFICE
CERTIFICATE OF CORRECTION

| | | |
|---|---|---|
| PATENT NO. | : 8,235,413 B2 | |
| APPLICATION NO. | : 12/662415 | |
| DATED | : August 7, 2012 | |
| INVENTOR(S) | : Stephen Lee Chapman | |

It is certified that error appears in the above-identified patent and that said Letters Patent is hereby corrected as shown below:

Column 8, line 1 should be deleted:

"It is important to note that the construction and arrangement of the pet restraint systems as shown in various exemplary embodiments is illustrative only."

Signed and Sealed this

Twentieth Day of November, 2012

David J. Kappos
*Director of the United States Patent and Trademark Office*